United States Patent
Pan et al.

(10) Patent No.: US 7,623,784 B1
(45) Date of Patent: Nov. 24, 2009

(54) NETWORK CONNECTION VERIFICATION IN OPTICAL COMMUNICATION NETWORKS

(75) Inventors: James J. Pan, Foster City, CA (US); Ian M. White, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 513 days.

(21) Appl. No.: 10/838,798

(22) Filed: May 4, 2004

(51) Int. Cl.
H04B 10/20 (2006.01)
(52) U.S. Cl. ........................................................ 398/58
(58) Field of Classification Search ................ 398/38, 398/1, 8, 194, 10, 16, 17, 22, 58; 340/309.7, 340/539.12; 379/229, 230, 219
See application file for complete search history.

(56) References Cited

U.S. PATENT DOCUMENTS

| | | | |
|---|---|---|---|
| 6,694,455 B1* | 2/2004 | Scrandis et al. | 714/31 |
| 6,704,407 B1* | 3/2004 | Woods et al. | 379/229 |
| 6,810,496 B1* | 10/2004 | Vittal | 714/57 |
| 6,917,759 B2* | 7/2005 | de Boer et al. | 398/5 |
| 2002/0176131 A1* | 11/2002 | Walters et al. | 359/118 |
| 2003/0021580 A1* | 1/2003 | Matthews | 385/147 |
| 2003/0061393 A1* | 3/2003 | Steegmans et al. | 709/250 |
| 2003/0180042 A1* | 9/2003 | Nelles et al. | 398/27 |
| 2006/0220838 A1* | 10/2006 | Wakim et al. | 340/539.12 |
| 2007/0043849 A1* | 2/2007 | Lill et al. | 709/224 |

* cited by examiner

*Primary Examiner*—Richard Hjerpe
*Assistant Examiner*—Shaheda A Abdin

(57) ABSTRACT

A method and a communication system are disclosed for automatically verifying the identity of a network connection in an optical communication network. Each network component of the optical communication network stores an identification code. For the method, one step includes positioning a read system proximate to one of the network components. With the read system in the proper position, another step of the method includes reading the identification code stored on the network component. Another step of the method includes verifying the identity of a network connection based on the identification code read from the network component by the read system. Another step of the method includes indicating the results of the verification using the read system. Based on the results of the verification, a field technician may verify the identity of a network connection before connecting or disconnecting a fiber optic cable or otherwise handling the network component.

24 Claims, 4 Drawing Sheets

NETWORK CONNECTION VERIFICATION IN OPTICAL COMMUNICATION NETWORKS

BACKGROUND OF THE INVENTION

1. Field of the Invention

The invention is related to the field of communications, and in particular, to the verification of the identity of network connections in an optical communication network. Still more particularly, the invention is related to verifying the identity of a network connection before a field technician may connect/disconnect a fiber optic cable from a network component.

2. Statement of the Problem

Many service providers use fiber optic cabling as a media for transmitting data because of its high-bandwidth capacity. Fiber optic cables can reliably transport optical signals over long distances, allowing the service providers to offer higher bandwidths to their customers. As the optical communication networks are built out to handle more users and more traffic, the amount of network connections, network components, fiber optic cables, and other equipment needed for the build out increases.

A typical hub for an optical communication network includes multiple racks, with each rack housing a plurality of line cards. Each line card has one or more slots configured to receive a network component, such as a transceiver, a repeater, an amplifier, etc. Most network components include one or more ports configured to receive a fiber optic cable. The network components are connected to one another using fiber optic cables according to connection diagrams for the optical communication network. The network components are also connected to the fibers dug into the ground to connect the hub to the rest of the optical communication network.

Due to the complexity of the network connections in a hub of the optical communication network, mistakes are frequently made by field technicians when servicing one of the hubs. For instance, assume that the service provider wants to provision a new wavelength on a DWDM optical communication network. To provision the new wavelength, network administrators will generate a connection diagram and a field technician will have to go to one or more hubs to make the proper network connections based on the connection diagram. Because there are so many network connections in a hub, the field technician can easily connect or disconnect the wrong fiber optic cable. Connecting or disconnecting the wrong fiber optic cables may unfortunately result in a slower delivery time of new services and/or a disruption in services to current customers.

SUMMARY OF THE SOLUTION

The invention helps solve the above and other problems by verifying the identity of a network connection in an optical communication network before a fiber optic cable is connected or disconnected from a network component or before the network component is otherwise handled by a field technician. The optical communication network according to the invention includes a plurality of network components. Examples of a network component comprise optical transceivers, lasers, optical line cards, router cards, etc. A method of verifying the identity of network connections in the optical communication network may include the following steps. One step of the method includes assigning an identification code to each network component. The identification code for each network component identifies the network component and/or distinguishes the network component from other network components. Another step of the method includes storing the identification code for a network component in the network component, such as in a memory. Another step of the method includes positioning a read system proximate to one of the network components. With the read system in the proper position proximate to the network component, another step includes reading the identification code stored on the network component using the read system. Another step of the method includes verifying the identity of a network connection based on the identification code read from the network component by the read system. Another step of the method includes indicating the results of the verification using the read system. For instance, indicating the results may mean sounding an alarm to indicate the results to the field technician, or displaying a message to the field technician. Based on the results of the verification, a field technician may verify the identity of a network connection before connecting or disconnecting a fiber optic cable from the network component or before otherwise handling the network component.

The invention may also be embodied in a communication system that includes an optical communication network and a read system. The optical communication network includes a plurality of network components that each is configured to store an identification code. The identification code may be previously assigned to each network component to identify the network component and/or distinguish the network component from other network components. The read system is configured to read an identification code stored on one of the network components when the read system is positioned proximate to the one network component. The read system is also configured to verify the identity of a network connection based on the identification code read from the network component, and indicate the results of the verification. For instance, indicating the results may mean sounding an alarm to indicate the results to the field technician, or displaying a message to the field technician. Based on the results of the verification, a field technician may verify the identity of a network connection before connecting or disconnecting a fiber optic cable from the network component or before otherwise handling the network component.

Advantageously, the invention may help to ensure that a field technician is making the proper network connections or disconnections within the optical communication network, and to reduce the chance of mistakes. If mistakes are reduced or eliminated, the services providers may be able to deliver new services to customers faster, and decrease service disruptions to the customers.

The invention may include other embodiments provided below.

DESCRIPTION OF THE DRAWINGS

The same reference number represents the same element on all drawings.

DETAILED DESCRIPTION OF THE INVENTION

FIGS. 1-4 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
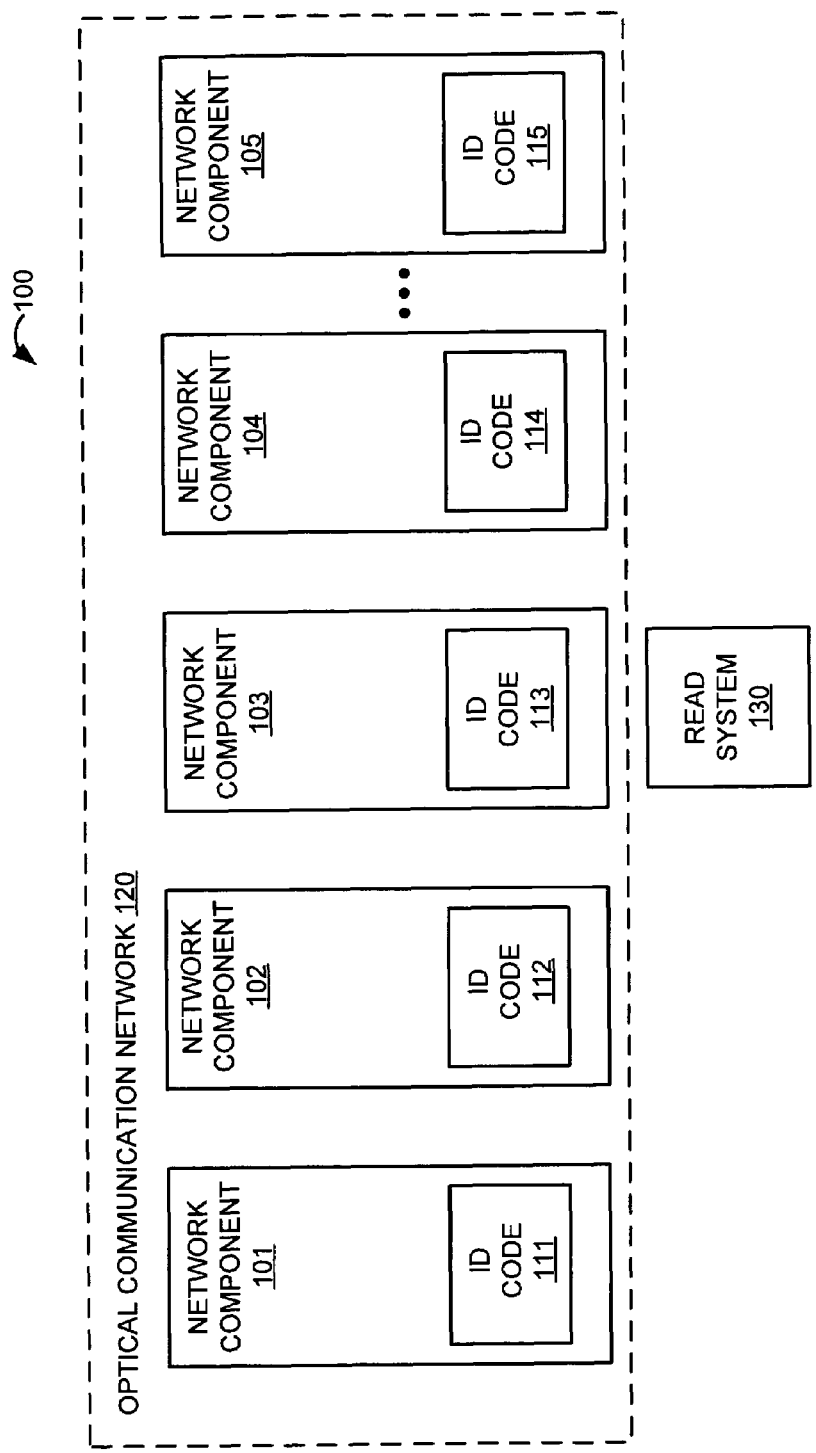
FIG. 1 illustrates a communication system in an embodiment of the invention.

FIG. 1 illustrates a communication system 100 in an embodiment of the invention. Communication system 100 includes an optical communication network 120 and a read system 130. Optical communication network 120 is comprised of a plurality of network components 101-105. Network components 101-105 may form part of optical communication network 120 and may be connected by multiple fiber optic cables that are not shown in FIG. 1. A network component comprises any system or device configured to connect to a fiber optic cable and to facilitate the transport of optical signals over the fiber optic cable. Examples of a network component comprise optical transceivers, lasers, optical line cards, router cards, etc. Read system 130 comprises any system, device, or component configured to read an identification code from a network component 101-105. Communication system 100 and optical communication network 120 may include other systems, devices, or components not shown for the sake of brevity.

Figure 2:
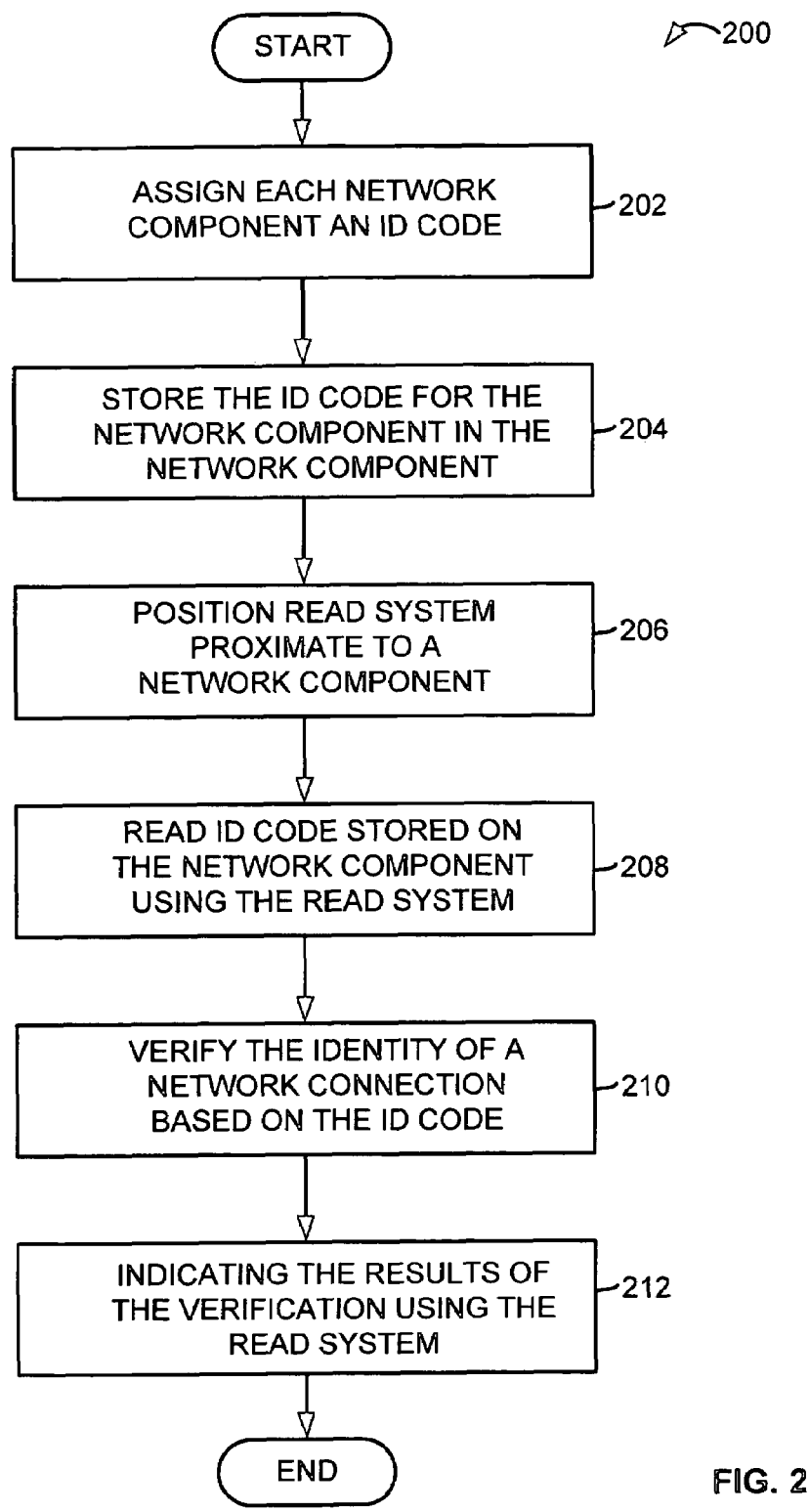
FIG. 2 is a flow chart illustrating a method of verifying the identity of network connections of an optical communication network in an embodiment of the invention.

FIG. 2 is a flow chart illustrating a method 200 of verifying the identity of network connections in optical communication network 120. Field technicians and network managers may want to verify the identity of network connections before field technicians connect/disconnect a fiber optic cable from a network component, such as to fix a problem with optical communication network 120, to add wavelengths to optical communication network 120, to debug optical communication network 120, etc. For instance, a field technician may be instructed to connect a fiber optic cable to network component 103 in FIG. 1 to add a wavelength to optical communication network 120. Before the field technician connects the fiber optic cable to network component 103, the following steps may take place.

Step 202 of method 200 includes assigning each network component 101-105 an identification code 111-115. The identification code identifies the network component and/or distinguishes the network component from other network components. Step 204 includes storing the identification code 111-115 for the network component 101-105 in the network component 101-105, such as in a memory (see FIG. 1). Steps 202 and 204 may be preliminary steps that are used by manufacturers of network components 101-105 or other parties dealing with the service provider. Steps 202-204 may take place before the network components 101-105 are incorporated into optical communication network 120.

When the network components 101-105 are incorporated into optical communication network 120 and the field technician needs to verify the identity of a network connection, the following steps may take place. Step 206 includes positioning read system 130 proximate to network component 103 (i.e., the network component having the network connection of which the field technician wants to verify the identity). Step 206 may include positioning read system 130 proximate to any one of network components 101-105, but network component 103 is used for illustration. Positioning in this instance may mean moving read system 130, a peripheral device or antenna for read system 130, etc, in the immediate area of network component 103. Positioning in this instance may also mean positioning read system 130 so as to connect read system 130 to network component 103 optically or electrically in a wireless fashion. With read system 130 in the proper position proximate to network component 103, step 208 includes reading the identification code 113 stored on network component 103 using read system 130. Reading in this instance may mean receiving a signal indicating the identification code 113, transmitting a signal to receive another signal indicating the identification code 113, transmitting a query to receive a response indicating the identification code 113, etc. Step 210 includes verifying the identity of a network connection based on the identification code 113 read from network component 103 by read system 130. Verifying the identity of a network connection means verifying a current network connection to network component 103, or verifying a potential or future network connection to network component 103. Step 212 includes indicating the results of the verification using read system 130. For instance, indicating the results may mean sounding an alarm to indicate the results to the field technician, or displaying a message to the field technician indicating the results.

If read system 130 indicates that the identity of the network connection has been verified, then the method 200 may further include authorizing the field technician to handle the network connection. For instance, the field technician may be authorized to connect a fiber optic cable to network component 103. Method 200 may be repeated multiple times to handle more network connections.

Advantageously, method 200 may help to ensure that a field technician is making the proper connections or disconnections within optical communication network 120, and to reduce the chance of mistakes. If mistakes are reduced or eliminated, the services providers may be able to deliver new services to customers faster, and decrease service disruptions to the customers.

Figure 3:
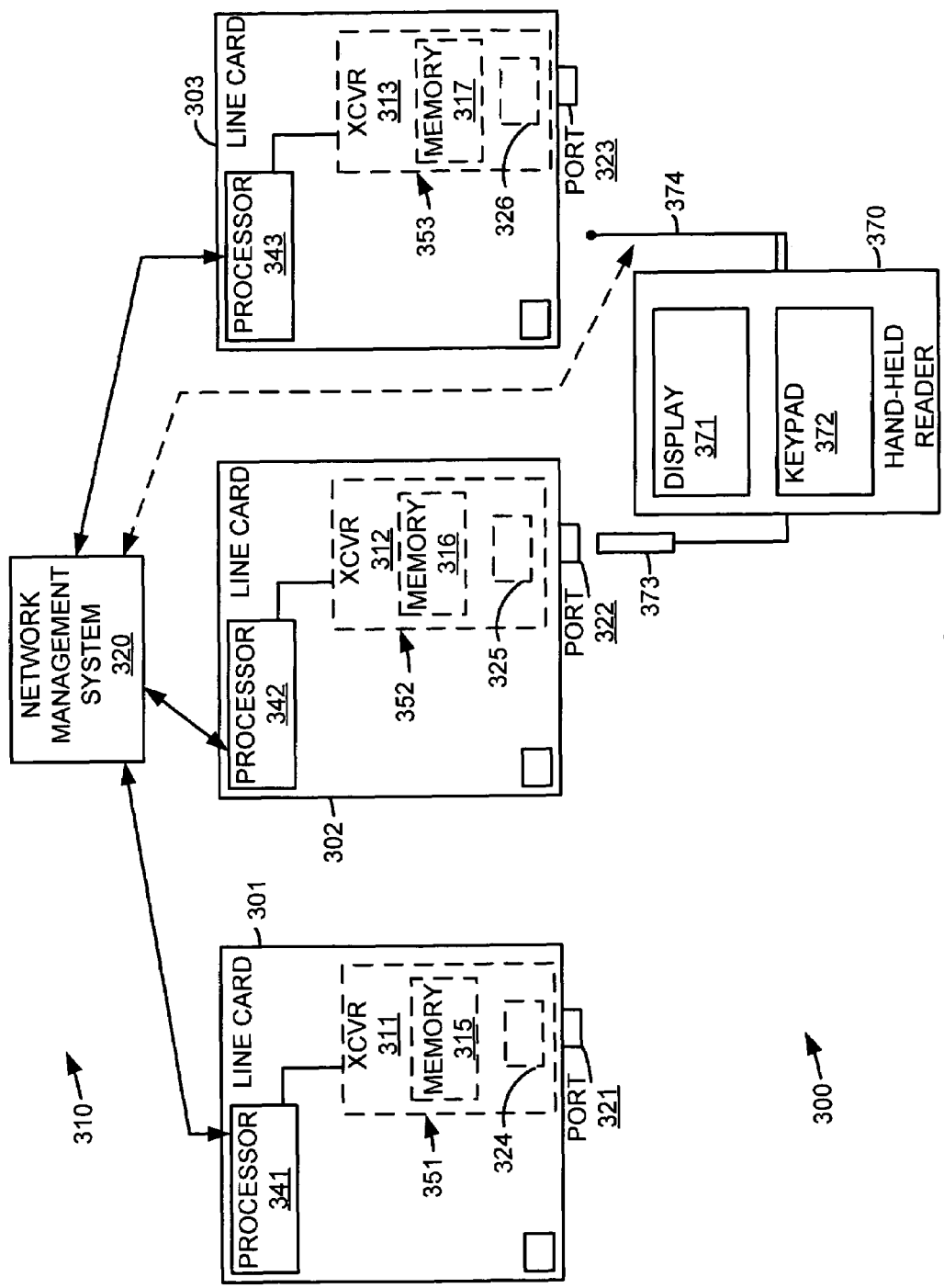
FIG. 3 illustrates another communication system in an embodiment of the invention.

FIG. 3 illustrates a communication system 300 in another embodiment of the invention. Communication system 300 is comprised of an optical communication network 310 and a hand-held reader 370. Optical communication network 310 is a DWDM optical network comprised of a plurality of line cards 301-303 and a network management system 320. Each line card 301-303 is able to communicate with network management system 320. The line cards 301-303 may be secured in racks (not shown), such as in a hub of an optical communication network. Optical communication network 310 may include many other line cards, systems, devices, or components not shown for the sake of brevity.

Line card 302 includes a processor 342 and a slot 352 configured to receive a network component. In this embodiment, a transceiver (XCVR) 312 represents the network component that is inserted in slot 352. Line card 302 may include a network component other than a transceiver, or may include multiple network components. When inserted in slot 352, transceiver 312 is able to communicate with processor 342 of line card 302. Transceiver 312 includes a memory 316, a wireless storage device 325, and a port 322. Line cards 301 and 303 may include similar configurations as line card 302.

Hand-held reader 370 may be used by a field technician for optical communication network 310. Reader 370 includes a display 371, a keypad 372, an antenna 373, and an antenna 374. Reader 370 is configured to use antenna 373 to read an identification code and possibly other information from storage devices such as storage device 325. Reader 370 is configured to use antenna 374 to communicate with other devices, such as with network management system 320. Antenna 373 is most likely a short range antenna, such as a Radio Frequency Identification (RFID) antenna. Antenna 374 is most likely a longer-range antenna, such as an antenna for a cell phone.

Figure 4:
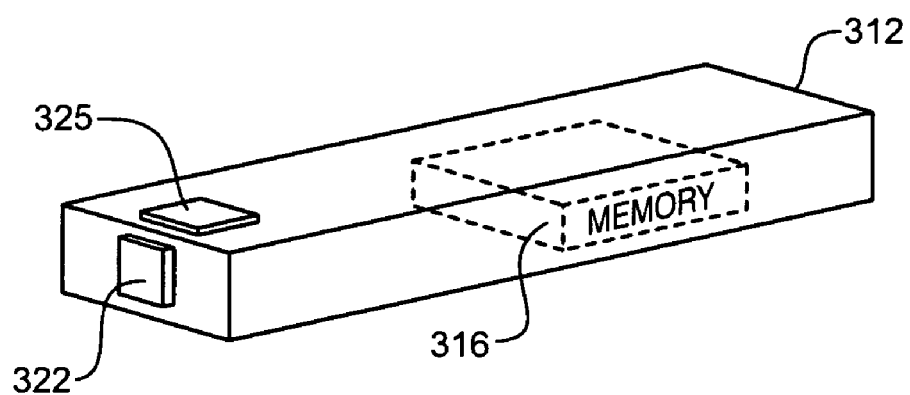
FIG. 4 shows an isometric view of a transceiver in an embodiment of the invention.

FIG. 4 shows an isometric view of transceiver 312 in an embodiment of the invention. Transceiver 312 includes memory 316, wireless storage device 325, and port 322. Storage device 325 comprises any device, component, or chip configured to store an identification code for transceiver 312 and communicate with hand-held reader 370. Storage device 325 may be affixed on or in transceiver 312 at any desired location. In one embodiment, storage device 325 may be affixed in close proximity to a fiber optic connection point, such as port 322 on transceiver 312. One example of a storage device 325 is an RFID tag. Port 322 comprises any interface configured to receive or connect with a fiber optic cable. Memory 316 comprises any device, component, or chip configured to store an identification code for transceiver 312 and communicate with processor 342 of line card 302 (see FIG. 3). Examples of memory 316 include an Electrical Programmable Read-Only Memory (EPROM) and an Erasable EPROM (EEPROM).

Transceiver 312 may comprise a Small Form Factor (SFF) transceiver. One example of an SFF transceiver is an FTRX-1411-3 Optical Transceiver from Finisar Corporation. Another example of an SFF transceiver is an XP3-SA2 Optical Transceiver from JDS Uniphase.

The following describes how the identity of network connections to transceivers 311-313 may be validated using identification codes to assist field technicians. In FIG. 3, each transceiver 311-313 is assigned an identification code. Each identification code is a different or globally unique identification code, number, address, etc., that identifies the transceiver and/or distinguishes the transceiver from other network components. The identification code may be a 32-bit address that resembles an Ethernet address. A manufacturer of the transceiver 331-313 may assign the identification codes. In another embodiment, a network administrator may assign the identification codes or the network management system 320 may automatically assign the identification codes.

The transceivers 311-313 store their identification code on storage devices 324-326, respectively. Storage devices 324-326 may comprise RFID tags, or some other device configured to store an identification code and provide a wireless signal indicating the identification code. The transceivers 311-313 may also store their identification code in memory 315-317, respectively. The identification codes stored in memory 315-317 may be used to register the identification codes and the corresponding transceivers 311-313 with network management system 320. For instance, when transceiver 312 is initially plugged into slot 352 of line card 302, transceiver 312 may forward its identification code stored in memory 316 to processor 342. Processor 342, in response to receiving the identification code, registers the identification code and transceiver 312 with network management system 320.

Assume that the network administrator wishes to add a wavelength to optical communication network 310. To add a wavelength, a field technician will have to connect or disconnect fiber optic cables to transceivers 311-313 and other transceivers not shown. An actual optical communication network will include many more transceivers and line cards connected by multiple fiber optic cables than that shown in FIG. 3. The number of transceivers and fiber optic cables may make connections and disconnections of fiber optic cables a difficult task.

To assist the field technician, the field technician may load a work order onto reader 370. The work order may include a list of instructions for the field technician to perform to provision the new wavelength. The network management system 320 may automatically generate the work order or network administrators may manually generate the work order. The field technician may load the work order onto reader 370 by connecting reader 370 to network management system 320 or another computer, either directly or remotely through antenna 374 while the field technician is in the field. Once connected to network management system 320, reader 370 may load the proper work order based on a work number.

When the field technician is at the proper hub of the optical communication network 310, the field technician may operate reader 370 to display a list of instructions to perform and/or a connection diagram from the work order. The work order may first instruct the field technician to connect a fiber optic cable to the transceiver in the second line card in the first rack (i.e., transceiver 312 in line card 302). Based on the instruction, the field technician identifies the transceiver that he/she thinks is the correct transceiver with which to connection the fiber optic cable. To verify the identity of the transceiver, the field technician positions antenna 373 of reader 370 proximate to transceiver 312. More precisely, the field technician positions antenna 373 of reader 370 proximate to storage device 325 of transceiver 312. When antenna 373 is properly positioned, reader 370 reads the identification code from storage device 325 of transceiver 312. Antenna 373 may read the identification code by transmitting a radio frequency signal to storage device 325, and receiving a radio frequency signal from storage device 325 indicating the identification code.

Because there may be multiple transceivers within a small area, antenna 373 is configured to communicate with only one storage device 325 even if two or more storage devices 325 are within a small area. For instance, if storage device 325 is an RFID tag, then the reception/transmission distance of the RFID tag may be limited to 2 cm or less to keep neighboring RFID tags from interfering with one another. To prevent false identification, antenna 373 reads only one storage device 325 when placed proximate to the storage device 325. One way to avoid false identifications is to instruct the field technician to insert antenna 373 partially or completely into port 322 of transceiver 312. If storage device 325 is located very close to port 322, then antenna 373 will be proximate to storage device 325 when the antenna 373 is inserted into port 322 of transceiver 312.

After reading the identification code from transceiver 312, reader 370 compares the identification code read from transceiver 312 with a known identification code for the transceiver needed for the proper network connection. Reader 370 knows the identification code of the transceiver needed for the proper network connection based on information in the work order. If the identification codes match, then reader 370 indicates the match for the proper network connection with an audible indicator such as a beep, or a visual indicator such as a message on display 371. Reader 370 may also authorize a connection or disconnection of a fiber optic cable to transceiver 312, or authorize the field technician to otherwise handle transceiver 312, based on the identification code read from transceiver 312 matching the known identification code. The field technician thus knows that the transceiver 312 is the proper transceiver for which to plug a fiber optic cable. Reader 370 may also indicate transceiver 312 and the proper network connection on a connection diagram for the convenience of the field technician.

If there is not a match of identification codes, the field technician knows that transceiver 312 is not the transceiver needed for the proper network connection. The field technician then needs to find the transceiver needed for the proper network connection.

The comparison of identification codes may take place in the network management system 320. For instance, reader 370 may read the identification code from storage device 325 of transceiver 312. Using antenna 374, reader 370 forwards the identification code read from transceiver 312 to network management system 320. Network management system 320 knows the identification code of the transceiver needed for the proper network connection based on information in the work order. Network management system 320 compares the identification code read from transceiver 312 to the known identification code for the transceiver needed for the proper network connection. If the identification codes match, then network management system 320 forwards a message to reader 370 indicating that transceiver 312 is the transceiver needed for the proper network connection. Responsive to the message, reader 370 provides an audible indicator, visual indicator, etc. If the identification codes do not match, then network management system 320 forwards a message to reader 370 indicating that transceiver 312 is not the transceiver needed for the proper network connection. Responsive to the message, reader 370 provides an audible indicator, a visual indicator, etc.

Line cards 301-303 or other network components in FIG. 3 may also be assigned identification codes. The identification codes may be stored on a storage device, such as an RFID tag. Field technicians may read the identification codes any time the identity of a network connection needs to be verified.

By storing identification codes on network components, a field technician may quickly verify the identity of the network connection by reading the identification code on the network component. This helps ensure that a field technician is making the proper connections or disconnections within an optical communication network, and reduces the chance of mistakes.

The identification code on a network component may be used to determine the identity of the network component for other reasons. For instance, if a new network component is needed to replace an existing network component, then the identification code of the existing network component may be read to verify the identity of the existing network component. Once the identity of the existing network component is verified, the existing network component may be replaced with the new network component.

What is claimed is:

1. A method of verifying the identity of a network connection in an optical communication network, the method comprising the steps of:
    positioning a read system proximate to one of a plurality of network components of the optical communication network, wherein each of the network components is configured to store an identification code;
    reading the identification code stored on the one network component when the read system is proximate to the one network component;
    verifying the identity of a network connection wherein the identification code read from the one network component is compared to a known identification code;
    indicating the results of the verification using the read system;
    if a connection is required, then authorizing the connection of a fiber optic cable to the one network component based on the identification code read from the one network component matching the known identification code; and
    if a disconnection is required, then authorizing the disconnection of the fiber optic cable to the one network component based on the identification code read from the one network component matching the known identification code.

2. The method of claim 1 further comprising:
    assigning an identification code to each of the network components.

3. The method of claim 2 wherein assigning the identification codes comprises:
    assigning a globally unique identification code to each of the network components.

4. The method of claim 2 further comprising:
    storing the identification code for the one network component in a memory in the one network component.

5. The method of claim 4 wherein the memory comprises an electrical programmable read-only memory (EPROM).

6. The method of claim 2 further comprising:
    storing the identification code for the one network component in a wireless storage device on the one network component.

7. The method of claim 6 wherein the wireless storage device comprises a Radio Frequency Identification (RFID) tag.

8. The method of claim 1 further comprising:
    registering the identification code stored in the one network component with a network management system.

9. The method of claim 1 further comprising:
    receiving the known identification code from a network management system in the read system; and
    comparing the known identification code with the identification code read from the one network component in the read system.

10. The method of claim 9 further comprising:
    transmitting the identification code read from the one network component to a network management system;
    comparing the known identification code with the identification code read from the one network component in the network management system; and
    transmitting the results of the comparison from the network management system to the read system.

11. The method of claim 1 wherein indicating the results of the verification using the read system comprises:
    sounding an audible alarm with the read system.

12. The method of claim 1 wherein indicating the results of the verification using the read system comprises:
    displaying a message to a user with the read system.

13. The method of claim 1 wherein reading an identification code stored on the one network component comprises:
    receiving a radio frequency signal indicating the identification code stored on the one network component.

14. The method of claim 1 wherein the one network component comprises a Small Form Factor (SFF) transceiver.

15. A communication system, comprising:
    an optical communication network comprising a plurality of network components, each of the network components configured to store an identification code; and
    a read system configured to read the identification code stored on one of the network components when the read system is positioned proximate to the one network component, verify the identity of a network connection wherein the identification code read from the one network component is compared to a known identification code, indicate the results of the verification, and if a connection is required, then authorize the connection of a fiber optic cable to the one network component based on the identification code read from the one network component matching the known identification code, and if a disconnection is required, then authorize the disconnection of the fiber optic cable to the one network component based on the identification code read from the one network component matching the known identification code.

16. The communication system of claim 15 wherein each of the network components is configured to store a globally unique identification code.

17. The communication system of claim 15 wherein each of the network components is configured to store the identification code for the network component in a memory in the network component.

18. The communication system of claim 17 wherein the memory comprises an electrical programmable read-only memory (EPROM).

19. The communication system of claim 15 wherein each of the network components is configured to store the identification code for the network component in a wireless storage device on the network component.

20. The communication system of claim 19 wherein the wireless storage device comprises a Radio Frequency Identification (RFID) tag.

21. The communication system of claim 15 wherein the read system is configured to:
  sound an audible alarm indicating the results of the verification.

22. The communication system of claim 15 wherein the read system is configured to:
  displaying a message to a user indicating the results of the verification.

23. The communication system of claim 15 wherein the read system is configured to read the identification code stored on the one network component by receiving a radio frequency signal indicating the identification code stored on the one network component.

24. The communication system of claim 15 wherein the one network component comprises a Small Form Factor (SFF) transceiver.

* * * * *

UNITED STATES PATENT AND TRADEMARK OFFICE
CERTIFICATE OF CORRECTION

PATENT NO. : 7,623,784 B1  
APPLICATION NO. : 10/838798  
DATED : November 24, 2009  
INVENTOR(S) : Pan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Twenty-sixth Day of October, 2010

David J. Kappos
*Director of the United States Patent and Trademark Office*